Apr. 10, 1923.

J. W. BROWN 1,451,202

AUTOMOBILE TOOL BOX SUPPORT

Filed Nov. 26, 1920

INVENTOR.
JAMES W. BROWN.
BY A. B. Bowman
ATTORNEY

Patented Apr. 10, 1923.

1,451,202

UNITED STATES PATENT OFFICE.

JAMES WILLIAM BROWN, OF SAN DIEGO, CALIFORNIA.

AUTOMOBILE TOOL-BOX SUPPORT.

Application filed November 26, 1920. Serial No. 426,444.

*To all whom it may concern:*

Be it known that I, JAMES WILLIAM BROWN, a citizen of the United States, residing at San Diego, in the county of San Diego and State of California, have invented certain new and useful Automobile Tool-Box Supports, of which the following is a specification.

My invention relates to a tool box for automobiles more particularly to the means for supporting the same and the objects of my invention are: first, to provide a tool box which is supported in connection with the bumper of an automobile; second, to provide a tool box of this class which may be supported in connection with either the front or rear bumper of an automobile; third, to provide a tool box of this class with supports which are applicable for use in connection with various makes of bumper supports; fourth, to provide novel means for supporting a tool box for automobiles and fifth, to provide a tool box and supports of this class which are very simple and economical of construction, durable, easy to install and which will not readily deteriorate or get out of order.

Figure 1:
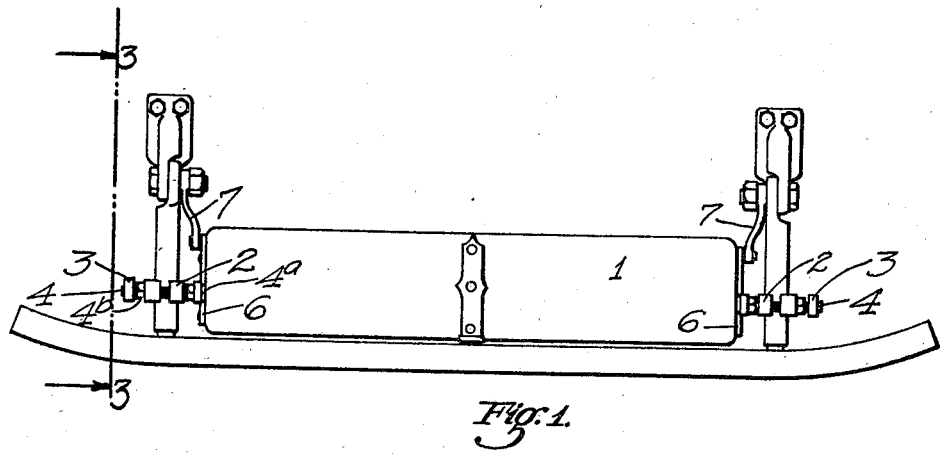
Figure 2:
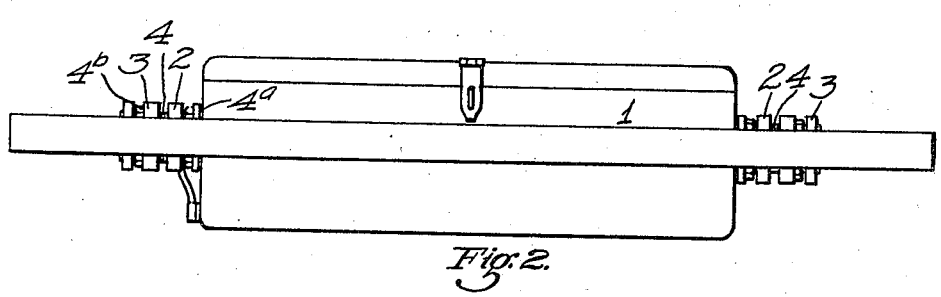
Figure 4:
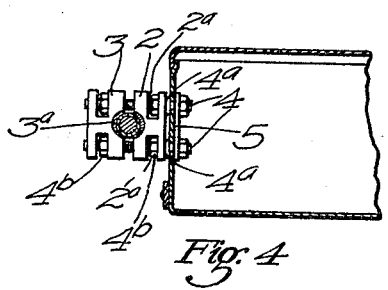
Figure 3:
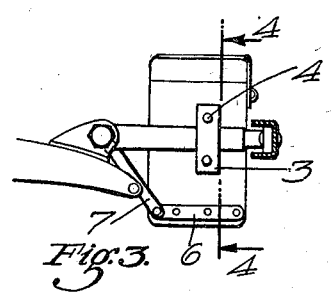

With these and other objects in view as will appear hereinafter my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a top or plan view of my tool box and its supporting means mounted in connection with the bumper and bumper supports of an automobile; Fig. 2 is a front elevational view thereof; Fig. 3 is a sectional view through 3—3 of Fig. 1 and Fig. 4 is a fragmentary sectional view through 4—4 of Fig. 3.

Similar characters of reference refer to similar parts and portions throughout the several views of the drawings.

The tool box 1, supporting clamp members 2 and 3, bolts 4, reinforcing plate 5, reinforcing plate 6 and brace 7 constitute the principal parts and portions of my tool box and support.

The tool box 1 may be of any shape desired, made of metal or wood but it is preferable to provide a long, narrow box as shown best in Figs. 1 and 2 of the drawings, so that the ends come in close proximity to the bumper supports at the ends. The box 1 is provided with reinforcing plates 5 on the inner side, one in each end which are provided with holes adapted for the bolts 4 and there are provided holes in the ends of the box conforming to the holes in these reinforcing members 5 adapted for the bolts to pass through and these bolts 5 are each provided with a flange $4^a$ thereon adapted to rest against the end of the box and are secured in position by means of nuts $4^c$. Mounted on these two bolts are the supporting members 2 and 3 at each end of the box. Each of these supporting members 2 and 3 are provided with holes in proper spaced relation to each other for receiving the extended ends of the bolts 4 and each is provided with oppositely disposed slots $2^a$ adapted for the nuts $4^b$ on the bolts 4 for supporting these supports 2 in certain position on the bolts 4. These supports 2 and 3 are provided with recesses $3^a$, facing each other in which are mounted resilient members, such as wood, rubber or felt, so that when the members 2 and 3 are clamped onto the bumper supports the paint will not be marred on said bumper supports. It will be noted that these bumper supports 2 and 3 may be positioned on the bolts in any desired position, thus making it applicable for use for different width bumper supports and that the nuts $4^b$ on the bolts serve for clamping the members 2 and 3 onto the bumper support as shown best in Figs. 1 and 4 of the drawings. In order to further support the box there is provided a reinforcing plate 6 near the bottom side of the box at the ends and with a brace 7 pivotally connecting this reinforcing member 6 and the end of the box with a bolt in the bumper support or in the end of the frame of the vehicle as desired, the object being a more rigid support for the box at the bottom.

Though I have shown and described a particular construction, combination and arrangement of parts and portions I do not wish to be limited to this particular construction, combination and arrangement but desire to include in the purview of my invention the construction, combination and arrangement substantially as set forth in the appended claims.

It is obvious that with this construction there is provided a tool box which is supported at either end of the vehicle in connection with the bumper and out of the way but readily accessible for use when it is desired to get at the tools; that the box may be supported either at the front or rear of the vehicle, between the bumper supports and in close proximity with the bumper proper; that in case springs are used in the bumper, the box 1 should be set away from the bumper sufficiently to provide the proper movement of the bumper; that the box is rigidly supported in connection with the bumper supports and is not liable to loosen, rattle or get out of order.

Having thus described my invention what I claim as new and desire to secure by Letters Patent is:

1. In a device of the class described, the combination with a conventional automobile, of brackets secured to the automobile side frames, bumper supports shiftably mounted on said brackets, a bumper secured near the ends of said bumper supports, a container positioned between said bumper supports contiguous to said bumper, and adjustable supporting means connected to said container and said bumper support for supporting said container in certain spaced relation from said support for various widths of automobile side frames.

2. In a device of the class described, the combination with a conventional automobile, of brackets secured to the automobile wheel base, bumper supports shiftably mounted on said brackets, a bumper secured near the ends of said bumper supports, a container positioned between said bumper supports contiguous to said bumper, adjustable supporting means connected to said container and said bumper support for supporting said container in certain spaced relation from said support for various widths of the vehicle wheel base and adjustable bracing means connecting with the lower side of said container and with the bumper supports for bracing said container.

3. A device of the class described, including an automobile bumper, shiftable supports for said bumper, an automobile tool box positioned between said supports contiguous to said bumper and adjustable means connected to said tool box adapted to be clamped on said bumper supports in various positions for supporting said tool box in certain spaced relation to said bumper supports.

4. A device of the class described, including an automobile bumper, shiftable supports for said bumper, an automobile tool box positioned between said supports contiguous to said bumper, adjustable means connected to said tool box adapted to be clamped on said bumper supports in various positions for supporting said tool box in certain spaced relation to said bumper supports and adjustable bracing means connecting with the lower side of said box and with the bumper supports for bracing said box.

5. A device of the class described, including a tool box, a pair of bolts secured to said tool box at its opposite ends, a pair of shiftable members mounted on said bolts provided with slots adapted to receive nuts on said bolts for clamping said members in certain relation to each other.

6. A device of the class described, including a tool box, a pair of bolts secured to said tool box at its opposite ends, a pair of shiftable members mounted on said bolts provided with slots adapted to receive nuts on said bolts for clamping said members in certain relation to each other and means connecting the lower side of said box with a bumper support for bracing the same.

In testimony whereof, I have hereunto set my hand at San Diego, California, this 20th day of November, 1920.

JAMES WILLIAM BROWN.